(12) United States Patent
Wiebe

(10) Patent No.: US 6,586,688 B2
(45) Date of Patent: Jul. 1, 2003

(54) INFORMATION-RELATED DEVICES AND METHODS

(75) Inventor: Linus Wiebe, Malmö (SE)

(73) Assignee: Anoto AB, Lund (SE)

( * ) Notice: Subject to any disclaimer, the term of this patent is extended or adjusted under 35 U.S.C. 154(b) by 223 days.

(21) Appl. No.: 09/813,113

(22) Filed: Mar. 21, 2001

(65) Prior Publication Data
US 2002/0033820 A1 Mar. 21, 2002

Related U.S. Application Data
(60) Provisional application No. 60/210,647, filed on Jun. 9, 2000.

(30) Foreign Application Priority Data
Apr. 5, 2000 (SE) .............................. 0001235

(51) Int. Cl.$^7$ ............................................. G06K 11/08
(52) U.S. Cl. ............................. 178/18.09; 178/18.01; 345/175; 382/188; 382/313
(58) Field of Search ................ 345/166, 175, 345/179, 181, 182; 382/188, 313; 178/18.01, 18.09, 19.01, 19.05

(56) References Cited

U.S. PATENT DOCUMENTS

| | | | |
|---|---|---|---|
| 5,221,833 A | 6/1993 | Hecht | |
| 5,852,434 A | 12/1998 | Sekendur | |
| 6,186,405 B1 * | 2/2001 | Toshioka | 235/494 |
| 6,249,273 B1 * | 6/2001 | Plog | 345/141 |

FOREIGN PATENT DOCUMENTS

| | | |
|---|---|---|
| EP | 0764944 A2 | 8/1996 |
| WO | WO 98/20446 | 5/1998 |
| WO | WO 00/73983 A1 | 12/2000 |
| WO | WO 01/16691 A1 | 3/2001 |
| WO | WO 01/26032 A1 | 4/2001 |
| WO | WO 01/71653 | 9/2001 |

OTHER PUBLICATIONS

Patent Abstracts of Japan, Publ. No. 10326331 A, Dec. 8, 1998.

* cited by examiner

Primary Examiner—Kent Chang
Assistant Examiner—Tom Sheng
(74) Attorney, Agent, or Firm—Birch, Stewart, Kolasch & Birch, LLP

(57) ABSTRACT

A product has a surface provided with a first coding pattern and a second coding pattern. The coding patterns may include symbols each of which represents at least two different values. Each symbol in the first coding pattern may be defined by one raster point and at least one marking, the raster point being included in a first raster, which extends over the surface. Each symbol in the second coding pattern may also be defined by one raster point and at least one marking, the raster point being included in a second raster. This second raster may be displaced in relation to the first raster and may have a different spatial scale than the first raster. Each symbol in the first and the second pattern may have a value which, for example, can be indicated by the location of the marking belonging to the symbol in relation to a raster point in the first and second raster, respectively.

46 Claims, 5 Drawing Sheets

INFORMATION-RELATED DEVICES AND METHODS

CROSS-REFERENCE TO RELATED APPLICATIONS

This application claims priority benefits based on Swedish Patent Application No. 0001235-1, filed Apr. 5, 2000, and U.S. Provisional Application 60/210,647, filed Jun. 9, 2000, the technical disclosures of both of which are hereby incorporated herein by reference.

FIELD OF THE INVENTION

The present invention relates to an apparatus and method for determining a position on a surface containing a coding pattern.

BACKGROUND OF THE INVENTION

In many situations it is desirable to determine an absolute position on a surface. For example, it may be desirable to determine a position on a surface when recording and digitizing a document such as a drawing or map. It may also be desirable to determine a position of a surface when creating an electronic version of handwritten information.

In these and other situations where position-determination is carried out, it is often desirable to have a computer program, in cooperation with an input device, carry out position-determination calculation and, in particular, to read and process position information and other information that, for example, can be related to the absolute positions read and determined.

U.S. Pat. No. 5,852,434 describes a device for determining an absolute position. The device comprises a writing surface, which has a position-coding pattern for determining X-Y coordinates, a detector, which can detect the position-coding pattern, and a processor, which can determine the position of the detector in relation to the writing surface based on the detected position-coding pattern. The device allows a user to input handwritten or hand-drawn information to a computer at the same time the information is written or drawn on the writing surface.

Generally, the smaller the symbols are, the more difficult it is to produce the patterned writing surface and the greater the risk of incorrect position determinations. On the other hand, the larger the symbols are, the worse the position resolution.

SUMMARY OF A FEW ASPECTS OF THE INVENTION

In accordance with the invention, there may be provided a surface comprising a first coding pattern of symbols and a second coding pattern of symbols wherein each symbol of the first coding pattern has at least two different values and each symbol of the second coding pattern has at least two different values. Each symbol of the first coding pattern may be defined by a first raster point and at least one first marking, wherein the first raster point is included in a first raster, which extends over the surface. Each symbol of the second coding pattern may be defined by a second raster point and at least one second marking, wherein the second raster point is included in a second raster which is displaced in relation to the first raster and has a different spatial scale than the first raster.

There may also be provided, a device for reading a position-coding pattern and an information-coding pattern on a surface, wherein the position-coding pattern and the information-coding pattern include symbols which each represent at least two different values, wherein the values depend on position information and other information for the position-coding pattern and the information-coding pattern, respectively. The device may include means for reading a part of the surface and storing the information read in an image, means for determining a first virtual raster with first raster points in the image associated with the position-coding pattern and a second virtual raster with second raster points in the image associated with the information-coding pattern. The second raster may be displaced in relation to the first raster and may have spatial scale other than that of the first raster. The device may also include means for locating a plurality of symbols in the position-coding pattern and the information-coding pattern and means for determining the value of each of said plurality of symbols. Each symbol in the position-coding pattern a first raster point in the first raster and at least one first marking and each symbol in the information-coding pattern may include a second raster point in the second raster and at least one second marking. Further, the device may include means for separating the position-coding pattern in the image into a first position code for a first coordinate for the partial surface and a second position code for a second coordinate for the partial surface by translating the value of each symbol into at least one first digit for the first position code and at least a second digit for the second position code. Still further, the device may include means for calculating the first coordinate based on the first position code and the second coordinate based on the second position code.

Further, there may also be provided a method for producing a position-coding pattern and an information-coding pattern on a surface, wherein the coding patterns comprise symbols, which each represents at least two different values. The values may depend on position information and other information for the position-coding pattern and the information-coding pattern, respectively. The method may also include determining a first raster with first raster points and a second raster with second raster points. The second raster may be displaced in relation to the first raster and may have a different spatial scale than the first raster. The method may also include determining a configuration of the symbols of the position-coding pattern and the information-coding pattern. Each symbol of the position-coding pattern may be defined by a first raster point in the first raster and at least one first marking and each symbol in the second coding pattern may be defined by a second raster point in the second raster and at least one second marking.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF PREFERRED EMBODIMENTS

Figure 1:
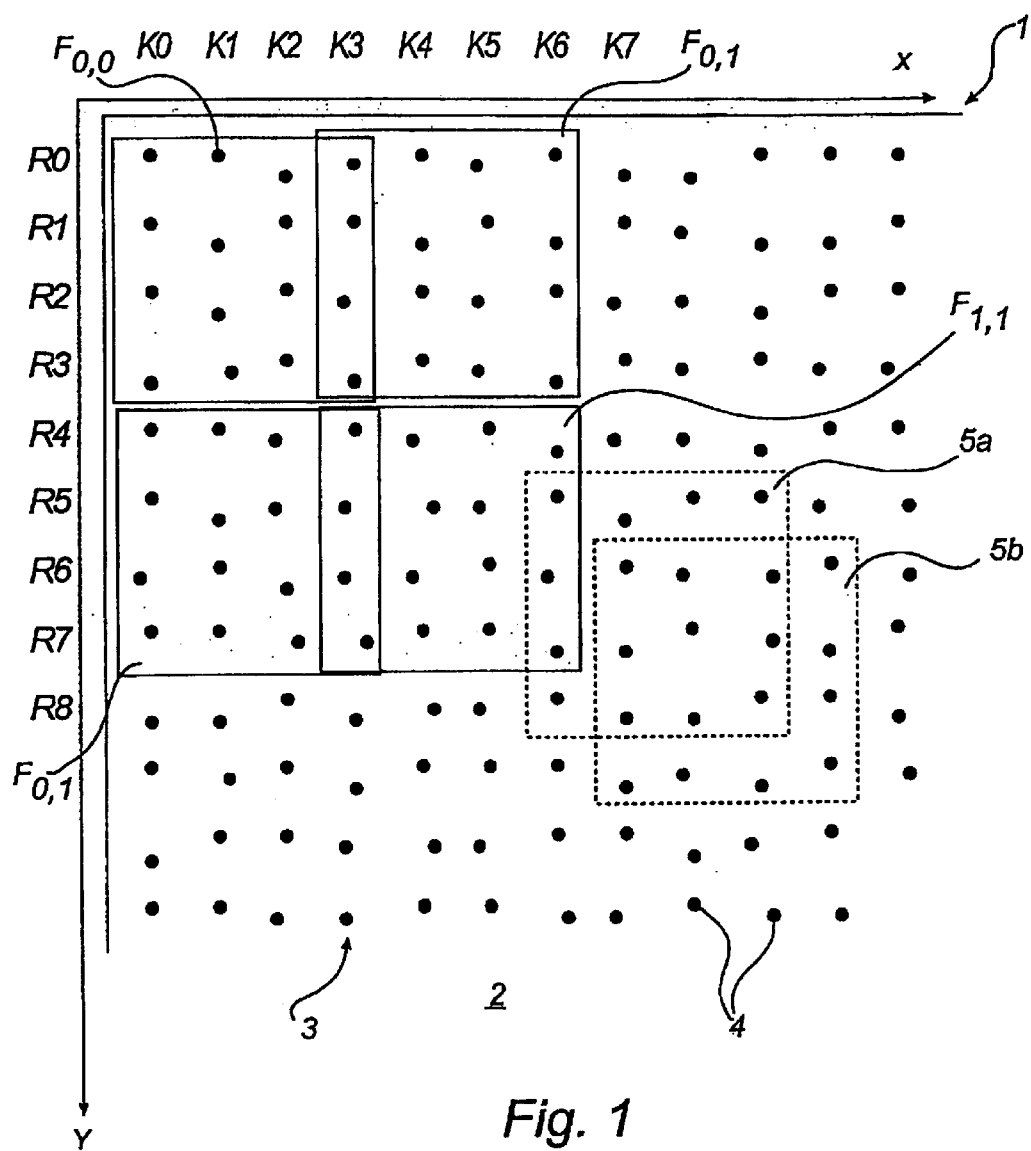
FIG. 1 shows an embodiment of a product that is provided with a position-coding pattern in accordance with the present invention.
Figure 2:
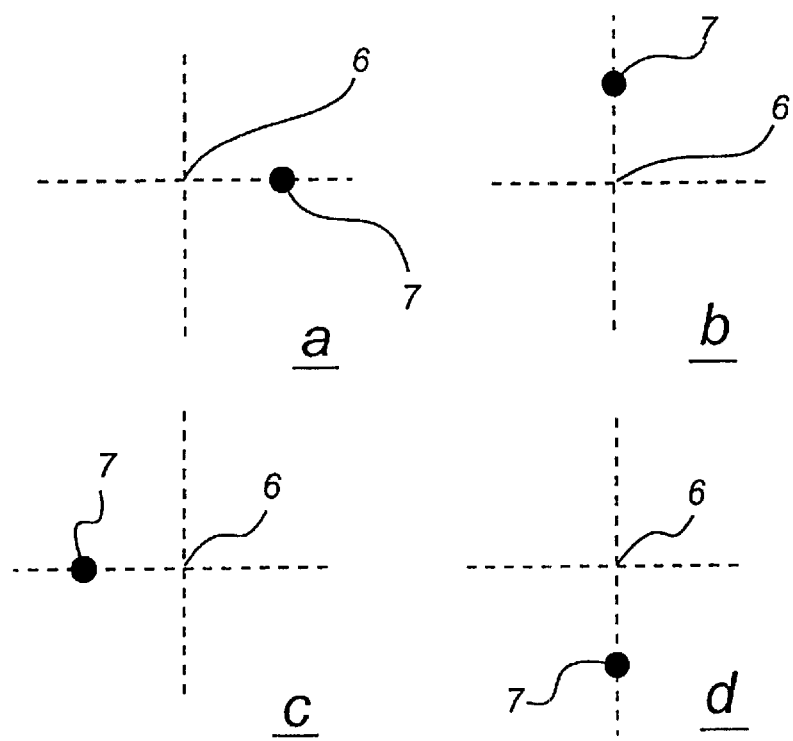
FIGS. 2a–2d show: symbol configurations in an embodiment of the present invention.

A first aspect of the invention may include a product which has a surface provided with a first coding pattern and a second coding pattern. The coding patterns may include symbols, which each represent at least two different values. Each symbol in the first coding pattern may be defined by a first raster point and at least one first marking, the first raster point being included in a first raster, which extends over the surface. Each symbol in the second coding pattern may also be defined by a second raster point and at least one second marking, the second raster point being included in a second raster. The second raster may be displaced in relation to the first raster and may also have a different spatial scale than the first raster. In a preferred embodiment, each symbol in the first and the second coding pattern may have a value that is indicated by a location of the first and second marking of the symbol in relation to the first raster point and the second raster point, respectively. Another preferred way of indicating the values of the symbols comprises varying the size of the markings as described in Applicant's International Application WO 00/73983, the technical disclosure of which is hereby incorporated herein by reference. Moreover, reference is also made to PCT/SE00/01895 and WO 01/16691, the technical disclosure of which is hereby incorporated herein by reference.

If the displacement between the first and the second raster, the distance between the raster points in the first raster, and the distance between the raster points in the second raster do not have a common denominator greater than one, unnecessary visual interference effects can be avoided when printing the pattern.

The first and second markings that are included in the symbols can be configured more or less arbitrarily. However, it may be preferable if the markings are of the simplest possible configuration, for example, round dots as disclosed herein.

With a coding-patterned product according to the above description, information can be stored on the product in the form of absolute-position information and other information of a more or less arbitrary nature. The different coding patterns can be displaced in relation to one another by a more or less optional distance and be of different spatial scales. As a result, the different patterns may not coincide with one another. A product according to the above description, can have a plurality of different coding patterns, for example three, in which the mutual displacements between the patterns should differ from one another. Such a patterned product may be advantageous in that the information density may be great and, in practice, only limited by the nature of the surface of the product and the printing technique that is used for the application.

Examples of other information that is stored in an information-coding pattern can be found in Applicant's Swedish Patent Application 0000947-2, the technical disclosure of which is incorporated herein by reference.

It may also advantageous that information is coded in different patterns since this may entail simple distinguishing between different types of information such as distinguishing between position information and other information that can be descriptive of the product to which the coding pattern is applied.

However, in the related art, because each position is typically coded with a complex symbol, recognition of many different elements is required, which make position coding sensitive to interference. According to the present invention, the value of a symbol is specified by the location of a marking in relation to a raster point. Thus, there is one type of symbol for each value. Therefore, a device that reads, determines positions, and decodes information only needs to detect one marking and does not need to differentiate between different elements (such as the different lines in a bar code) in order to determine the value of the symbols. Detection thus becomes simpler and less sensitive to interference.

As mentioned above, in the related art, each position may be coded with a single symbol, which, therefore, must be rather complex. According to the present invention, each position may be coded with a plurality of symbols. Each individual symbol can thus be made less complex and simpler to detect with greater reliability. Furthermore, in the related art, each position may be coded with a symbol that is "isolated" from the symbols of surrounding positions. This may limit the position resolution of the surface occupied by the symbol for a position. The position-coding pattern according to the present invention can be made up in corresponding manner where each position is coded by an "isolated" group of symbols. However, in a preferred embodiment of the invention, each symbol may contribute to the coding of more than one position. In this manner, a "floating" transition between different positions may be created. In other words, each position may be coded partly by the same symbols as the adjoining positions. Floating coding may be advantageous since it may increase position resolution. Furthermore, it is possible to reduce the relationship between, on the one hand, the number of symbols which a position-determining device must register to carry out a position determination reliably and, on the other hand, the number of symbols which code a position.

In a preferred embodiment, each symbol may contribute to the coding of both a first and a second position coordinate. Thus, different symbols are not necessarily needed for the different coordinates, which may make the position code simpler and the position resolution better. The coordinate system can be suitably Cartesian but other types of coordinate systems are also conceivable.

Furthermore, the value of each symbol can be translated into at least one first digit, which may be used for coding the first coordinate, and at least one second digit, which may be used for coding the second coordinate. The symbols in the position-coding pattern together may represent a first position code for the first coordinate and a second position code for the second coordinate. The two coordinates can then be coded independently of one another, which may make the coding simpler when the coding is "floating". Preferably, the value of a symbol is represented in a binary manner with a first bit for coding a first coordinate and a second bit for coding a second coordinate.

The position-coding pattern may be based on a first cyclic, preferably binary, number series where no sequence with a first predetermined number of digits in the number series appears more than once. Because the position-coding pattern may be based on a first cyclic number series, it will likely contain inherent information about the positions so that the coordinates can be calculated according to predetermined rules. This may be advantageous in that the decoding of the position-coding pattern can be implemented in an efficient manner in software, for example. Besides, it might be much simpler to produce a position-coding pattern in this way than trying to randomly generate an unambiguous position-coding pattern of a floating type.

In another embodiment, a product may comprise a plurality of writing surfaces, which each comprise a position-coding pattern. For example, the product can consist of a notepad with a plurality of sheets. The position-coding patterns may then differ for the different writing surfaces by the sequence in the cyclic number series with which a predetermined column or row begins. The "same" pattern can thus be used for a plurality of writing surfaces which can be separated from or integrated with one another by allowing, for example, the first column to begin in different positions in the number series.

Although the coding patterns have been discussed above in terms of a separate position-coding pattern and a pattern coding other information, it is possible that both coding patterns encode position information. In such a case the first position-coding pattern may encode positions from a first region or area and the second position-coding pattern may encode positions from a second region or area. Needless to say, more than one position coding pattern may also increase the total size of the region available for use.

The position-coding pattern can be implemented with any parameter that can produce symbols of the above-mentioned type and that can be detected by a detector. The parameter can be electrical or chemical or of another type. However, the position-coding pattern is preferably optically readable which makes it simpler to apply to the surface. The pattern should thus be able to reflect light, but, the light does not need to lie within the visible range.

The raster and/or the raster points can be implemented on the surface. However, in a preferred embodiment, the raster and the raster points are virtual. Thus, the raster is not marked on the surface at all, but, is an imaginary raster that forms the base of the coding. The raster can be located from the location of the markings.

A second aspect of the invention is to produce by means of a method a position-coding pattern and an information-coding pattern on a surface. The coding patterns may comprise symbols, which each represent at least two different values, wherein the values depend on position information and other information for the position-coding pattern and the information-coding pattern, respectively. The method may include determining a first raster with first raster points and a second raster with second raster points. The second raster is displaced in relation to the first raster and may have a different spatial scale than the first raster. Each symbol in the position-coding pattern may be defined by a first raster point in the first raster and at least one first marking, and each symbol in the information-coding pattern may be defined by a second raster point in the second raster and at least one second marking. In a preferred embodiment, the configuration of the symbols in the position-coding pattern and the information-coding pattern may be determined by displacing the markings of the symbols, based on the value of the symbols, in relation to each first raster point and second raster point in the first and second raster, respectively. A computer program can implement the method.

Based on a method according to the above description, information about absolute positions on the surface of a product can be applied with any other information in a second coding pattern, which is displaced and provided with a different spatial scale compared with the position-coding pattern.

An advantage of the method may be that the different coding patterns do not have to be applied on the surface of a product on the same occasion. Instead, the times of applying the different patterns can be separated and carried out by means of different application devices. For example, a sheet of paper with a background pattern in the form of a position-coding pattern can be used in a laser printer coupled to a personal computer that prints an arbitrary number of other position-coding patterns with mutually varying displacements between their respective rasters.

One example of the utilization of a combined position- and information-coding pattern can be in the form of blank forms where a position-coding pattern is printed on a sheet of paper. The sheet of paper may be provided by a user with an information-coding pattern and other graphical information such as, for example, a grid pattern, figures etc. where information in the form of, for example, sequences of digits that represent data, which is related to the grid pattern or the graphical figures, is coded with the aid of the symbols in the information-coding pattern. When the combined position- and information-coding pattern is read, both position-information and the data that is related to the graphical figures, which are printed on the sheet of paper with the position-coding pattern, may be obtained.

If both coding patterns encode position information, the first position-coding pattern may encode positions from a first region or area and the second position-coding pattern may encode positions from a second region or area. When reading symbols from a product provided with such a combination of two position-coding patterns, coordinates may be simultaneously read from the two regions. This fact that coordinates from different regions have been encountered can be interpreted, e.g., as a particular event which may trigger actions in the controlling software in the reading device or in a computer with which the device communicates. Moreover, the fact that coordinates from different regions are read simultaneously may be used to infer a more general association or link between the two regions.

A third and a fourth aspect of the present invention shows a method and a device, respectively, for reading a position-coding pattern and an information-coding pattern on a surface. The coding patterns may comprise symbols, which each represents at least two different values wherein the values depend on position information and other information for the position-coding pattern and information-coding pattern, respectively. The method may include reading a part of the surface and storing the information read in the form of an image. A first virtual raster of the position-coding pattern and a second virtual raster of the information-coding pattern are determined from the image. The first virtual raster and the second virtual raster contain raster points The first virtual raster and the second virtual raster may be displaced in relation to one another and may have different spatial scales. Pluralities of symbols may be located in both the position-coding pattern and the information-coding pattern. Each symbol in the position-coding pattern may be defined by a first raster point in the first raster and at least one first marking and each symbol in the information-coding pattern may be defined by a second raster point in the second raster and at least one second marking. The method may further include determining the value of each of the symbols by determining a displacement of the location of the markings with respect to each respective raster point in the first and the second raster, respectively.

The position-coding pattern in the image may be separated into a first position code for a first coordinate for the partial surface and a second position code for a second coordinate for the partial surface by translating the value of each symbol into at least one first digit for the first position code and at least one second digit for the second position code. The first coordinate may be calculated by means of the first position code and the second coordinate may be calculated by means of the second position code.

A computer program in a reading device in pen format that includes a computer, for example, can implement the method.

A central part of a reading method according to the above description may be to separate the different coding patterns into the input images of a partial surface. This may be done by means of image-processing software in an input device, or software in a computer connected to an input device. The image-processing software may have the capacity to transfer image information from a spatial domain to a spatial frequency domain and to analyze the distribution of the spatial frequencies in the input image. This frequency distribution may provide information about distances between frequency peaks in the frequency domain and thus also information about each spatial resolution level, i.e. what different patterns and phase differences, i.e. rotations between patterns, are found in the image. The information obtained may then be used for determining coordinates of each of the, preferably virtual, raster points in the patterns and thus makes it possible to determine the displacement of each marking in relation to the raster point in the symbols which make up the pattern.

A position-coding pattern will be presented with reference to FIGS. 1, 2a–d, and 3, without being combined with another coding pattern. The purpose of this is to clarify and exemplify the principle of coding information in the form of patterns consisting of symbols. After the presentation of the position-coding pattern, a device is then presented in connection with FIG. 4, which can read the pattern. After that, with reference to FIG. 5, it is shown how a combined position-coding pattern and information-coding pattern can be arranged FIG. 6 then illustrates a distribution of spatial frequencies for an input image of a partial surface on which two coding patterns have been applied. In connection with FIG. 6, it will also be discussed how reading and interpreting of a coding-patterned surface may be carried out according to the invention.

FIG. 1 shows a part of a product in the form of a sheet of paper 1, which on its surface 2 has an optically readable position-coding pattern 3, which enables position determination to be performed. The position-coding pattern 3 may consist of symbols 4, which are systematically arranged over the surface 2 so that it has a "patterned" appearance. As exemplified in FIG. 1, the symbols comprise markings, which, for the sake of clarity, are round and of constant size.

The sheet of paper may have an x coordinate axis and a y coordinate axis. In this case, position determination can be carried out on the surface of the whole product. In other cases, the surface provided with a position coding pattern may consist of a smaller part of the product.

The position-coding pattern 3 may comprise a virtual raster, which is neither visible to the human eye nor detectable by a device that determines positions on the surface. The position-coding pattern 3 may further comprise a plurality of symbols 4, each assuming one of four values "1"–"4" as will be described in the text that follows. In FIG. 1, the position-coding pattern 3 has been greatly enlarged for the sake of clarity. Also, only a part of the paper is shown.

The position-coding pattern 3 may be arranged so that the position of a partial surface on the writing surface is coded by the symbols on this partial surface. A first and a second partial surface 5a, 5b are shown by dashed lines in FIG. 1. The part of the position-coding pattern 3 (in this case 3×3 symbols) that is located on the first partial surface 5a may code a first position, and the part of the position-coding pattern 3 that is located on the second partial surface 5b may code a second position. The position-coding pattern 3 may thus be partially common to the adjoining first and second positions. Such a position-coding pattern is designated as "floating" in this disclosure.

FIGS. 2a–d show an embodiment of a symbol that can be used in the position-coding pattern 3 according to the invention. The symbol may be defined by a virtual raster point 6, which is represented by the intersection between the raster lines, and a marking 7, which may have the form of a dot. The value of the symbol may depend on where the marking is located. In the example in FIG. 2, there are four possible locations, one on each of the raster lines extending from the raster points 6. The displacement from the raster point 6 may be equal for all values. In the text that follows, the symbol has the value 1 in FIG. 2a, the value 2 in FIG. 2b, the value 3 in FIG. 2c, and the value 4 in FIG. 2d. In other words, there are four different types of symbol.

Thus, each symbol can represent four values "1–4". This means that the position-coding pattern 3 can be divided into a first position code for the x coordinate, and a second position code for the y coordinate. The dividing is done in accordance with the following:

| Symbol value | x code | y code |
| --- | --- | --- |
| 1 | 1 | 1 |
| 2 | 0 | 1 |
| 3 | 1 | 0 |
| 4 | 0 | 0 |

Thus, the value of each symbol may be translated into a first digit, in this case a first the x code and a second digit, in this case second bit, for the y code. In this manner, two completely independent bit patterns may be obtained. The patterns can be combined into a common pattern, which may be coded graphically with the aid of a symbols according to FIG. 2.

Each position may be coded by means of a plurality of symbols. In this example, 4×4 symbols are used for coding a position in two dimensions, i.e. an x coordinate and a y coordinate.

The position code may be built up by means of a number series of ones and zeros where no sequence of four bits, in the number series, occurs more than once. The number series may be cyclic, which means that no sequence of four bits, in the number series more than once if the end of the series is coupled together with its beginning. Thus, a sequence of four bits always has an unambiguously determined position in the number series.

The number series can be maximally 16 bits long for a sequence of four bits to always have an unambiguously determined position in the number series. In this example, however, only a seven-bit-long number series according to the following is used:

"0 0 0 1 0 1 0"

This series contains seven unique sequences of four bits, which code a position in the series according to the following:

| Position in this series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

To code the x coordinate, the number series may be written sequentially in columns over the surface that is to be coded. The coding may be based on the difference or position displacement between numbers in adjoining columns. The magnitude of the difference may be determined by the position in the number series at whish the column allowed to begin (i.e. with which sequence). More specifically, taking the difference modulo seven between, on the one hand, a number which is coded by a four-bit sequence in a first column and which thus can have the value (position) 0–6, and, on the other hand, a corresponding number (i.e. a sequence on the same "level") in an adjoining column, may yield the same result independently of where along the two columns the comparison is made. Using the difference between two columns, an x coordinate can thus be coded which is constant for all y coordinates.

Since each position on the surface is coded with 4×4 symbols in this example, three differences (having the value 0–6) are available according to the above for coding the x coordinate. The coding may then be carried out in such a manner that of the three differences, one will always have the value 1 or 2 and the other two will have the value in the interval 3–6. Thus, no differences will be zero in the x code. In other words, the x code may be constructed in such a manner that the differences will be as follows:

(3–6) (3–6) (1–2) (3–6) (3–6) (1–2) (3–6) (3–6) (3–6) (1–2) . . .

Each x coordinate may thus be coded with two numbers between 3 and 6 and a subsequent number that is 1 or 2. If three is subtracted from the high numbers and one from the low one, a number in mixed base will be obtained which directly provides a position in the x direction, from which the x coordinate can then be determined directly as shown in the example below.

Using the principle described above, it is thus possible to code x coordinates 0, 1, 2 . . . by means of numbers which represent three differences. These differences may be coded with a bit pattern that is based on the above number series. Finally, the bit pattern can be coded graphically with the aid of the symbols in FIG. 2.

In many cases, when reading 4×4 symbols it may not be possible to get a complete number which codes the x coordinate but parts of two numbers. Since the least significant part of the numbers is always 1 or 2, however, a complete number can be reconstructed in a simple manner.

The y coordinates may be coded in accordance with the same principle as used for the x coordinates. The cyclic number series may be written repeatedly in horizontal rows over the surface that is to be position-coded. Exactly as in the case of the x coordinates, the rows may be allowed to begin at different positions, i.e. with different sequences, in the number series. However, it may not be the differences that are used for the y coordinates, but the coordinates may be coded with numbers which are based on the starting position of the number series in each row. When the x coordinate for 4×4 symbols has been determined, it is, in fact, possible to determine the starting position in the number series for the rows that are included in the y code in the 4×4 symbols. In the y code, the most significant digit may be determined by allowing this to be the only one that has a value in a specific interval. In this example, one row of four is allowed to begin at position 0–1 in the number series to indicate that this row relates to the least significant digit in a y coordinate, and the other three begin at positions 2–6. In the y direction, there is thus a series of numbers as follows:

(2–6) (2–6) (2–6) (0–1) (2–6) (2–6) (2–6) (0–1) (2–6) . . .

Each y coordinate may be thus coded with three numbers between 2 and 6 and a subsequent number between 0 and 1.

If 0 is subtracted from the low number and 2 from the high ones, a position in the y direction in mixed base may be obtained, in the same manner as for the x direction, from which the y coordinate can be determined directly.

With the above method, it is possible to code 4×4×2=32 positions in the x direction. Each such position may correspond to three differences, giving 3×32=96 positions. Furthermore, it is possible to code 5×5×5×2=250 positions in the y direction. Each such position may correspond to 4 rows, giving 4×250=1000 positions. Together, it is thus possible to code 96000 positions. Since the x coding may be based on differences it is, however, possible to select the position at which the first number series begins. Taking into consideration that this first number series can begin at seven different positions, it is possible to code 7×96000=672000 positions. The starting position of the first number series in the first column can be calculated when the x coordinate has been determined. The above-mentioned seven different starting positions of the first series can code different sheets or writing surfaces on a product.

To further illustrate the invention according to this embodiment, a specific example follows here which is based on the embodiment of the position code described.

Figure 3:
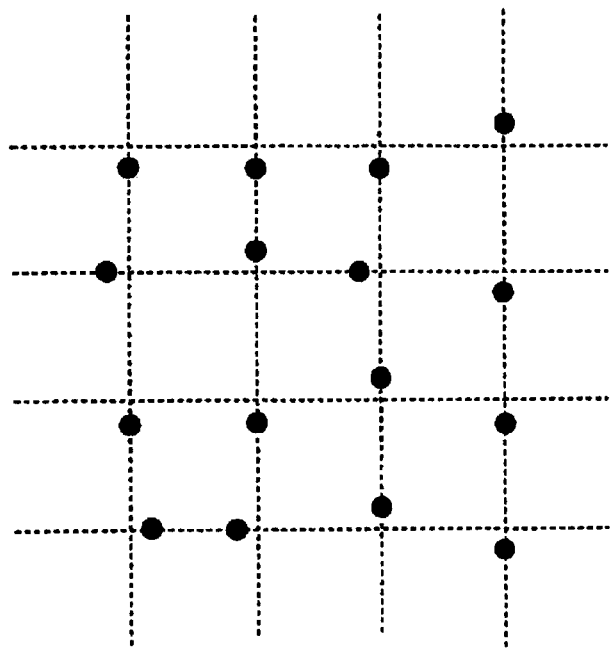
FIG. 3 shows an example of 4×4 symbols that may be used for coding a position in accordance with the present invention.

FIG. 3 shows an example of an image with 4×4 symbols that may be read by a device for position determination.

These 4×4 symbols have the following values:

| |
|---|
| 4442 |
| 3234 |
| 4424 |
| 1324 |

These values represent the following binary x and y codes:

| x code: | y code: |
|---|---|
| 0000 | 0001 |
| 1010 | 0100 |
| 0000 | 0010 |
| 1100 | 1010 |

The vertical x sequences code the following positions in the number series: 2, 0, 4, and 6. The differences between the columns will be −2 4 2, which modulo 7 gives 5, 4, 2, which, in mixed base codes position (5−3)×8+(4−3)×2+(2−1)=16+2+1=19. Since the first coded x position is position 0, the difference which lies in the interval 1−2 and which appears in the 4×4 symbols is the twentieth such difference. Since, furthermore, there are a total of three columns for each such difference and there is a start column, the farthest vertical sequence to the right in the 4×4 x code belongs to the 61st column in the x code (3×20+1=61) and that farthest to the left belongs to the 58th.

The horizontal y sequences code the following positions in the number series: 0, 4, 1, and 3. Since these series begin in the 58th column, the starting position of the rows are these numbers minus 57 modulo 7, providing the starting positions 6, 3, 0, 2. Translated into digits in the mixed base, this becomes 6−2, 3−2, 0−0, 2−2=4 1 0 0, where the third digit is the least significant digit in the number in question. The fourth digit is then the most significant digit in the next number. In this case, it must be the same as in the number in question. (The exception is when the number is question consists of the highest possible digits in all positions. It is then apparent that the beginning of the next number is one greater than the beginning of the number in question).

The position of the four-digit number becomes 0×50+4×10+1×2+0×1=42 in the mixed base.

The third row in the y code is thus the 43rd which has starting position 0 or 1, and since there are four rows in total in each such row, the third row is number 43×4=172.

Thus, in this example, the position of the top left-hand corner for the 4×4 symbol group is (58,170).

Since the x sequences in the 4×4 group begin in row 170, the x columns of the entire pattern begin at positions ((2 0 4 6)-169) modulo 7=1 6 3 5 of the number series. Between the last starting position (5) and the first starting position, the numbers 0–19 are coded in mixed base and by adding together the representations for numbers 0–19 in mixed base, the total difference between these columns is obtained. A primitive algorithm for doing this is to generate these twenty numbers and directly add together their digits. The sum obtained is called s. The sheet of paper or writing surface is then given by (5-s) modulo 7.

In the example above, an embodiment has been described in which each position is coded with 4×4 symbols and a number series with 7 bits is used. Naturally, this is only an example. Positions can be coded with more or fewer symbols. The number of symbols does not need to be the same in both directions. The number series can have different lengths and do not need to be binary but may be built on another base. Different number series can be used for coding in the x direction and coding in the y direction. The symbols can have different numbers of values.

In the example above, furthermore, the marking is a dot. Naturally, it can have a different appearance. For example, it may consist of a polygon or other shape.

In the example above, the symbols are used within a square partial surface for coding a position. The partial surface can have another form, for example hexagonal or other shape. Neither do the symbols need to be arranged in rows and columns at an angle of 90 degrees with respect to one another but can also be arranged in other configurations.

Depending on the details of the embodiment, for the position code to be detectable, the virtual raster must be determined. In the case of only one pattern, this can be done by studying the distance between different markings. The shortest distance found between two markings must originate from two adjoining symbols having the value 1 and 3 so that the markings are located on the same raster line between two raster points. When such a pair of markings has been detected, the associated raster points can be determined with knowledge of the distance between the raster points and the displacement of the markings from the raster points. Once two raster points have been located, further raster points can be determined by means of measured distances to other markings and with knowledge of the relative distances of the raster points. With two or more superimposed coding patterns, the process of identifying the patterns is somewhat different, as will be described in greater detail below in connection with FIGS. 5 and 6.

Figure 4:
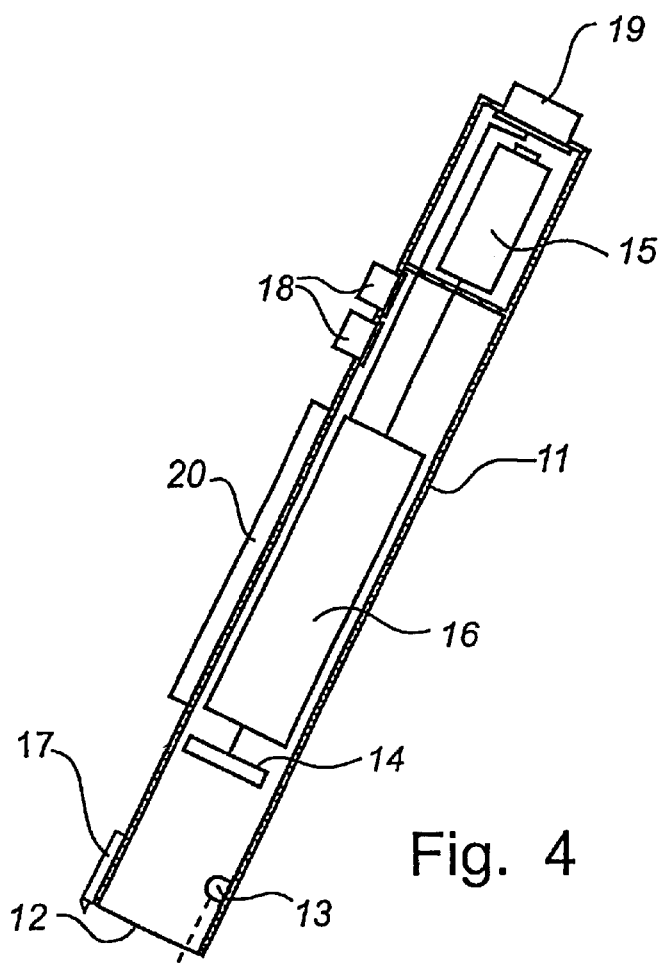
FIG. 4 shows a device that may be used for reading a coding pattern according to the present invention.

An embodiment of an exemplary device for position determination is shown schematically in FIG. 4. It may include a casing 11, which may have the approximate format of a pen. In a short end of the casing, there may be an opening 12. The short end may bear against or may be held at a short distance from the surface from which information is fetched.

The casing may be configured to accommodate an optical part, an electronic part, and a power supply.

The optical part may include at least one light-emitting diode 13 for illuminating the surface to be imaged and a light-sensitive area sensor 14, for example a CCD or CMOS sensor for registering a two-dimensional image. The device may also contain a lens system.

The power supply for the device may be obtained from a battery 15, which may be mounted in a separate compartment in the casing.

The electronic part may include an image-processing means 16 for determining a position on the basis of the image registered by the sensor 14 and, more specifically, a processor unit with a processor programmed for reading images from the sensor and carrying out position determination and information decoding on the basis of these images.

In this embodiment, the device may also comprise a pen point 17 for writing normal pigment-based writing on the surface on which the position determination is to be carried out. The pen point 17 can be retracted and extended so that the user can control whether it is to be used. In certain applications, the device does not need to have any pen point at all, or may employ some other marking implementation.

The device may also include buttons 18, for actuating and controlling the device. It may also have a transceiver 19 for wireless transmission, e.g. by means of IR light or radio waves, of information to and from the device. The device can also include a display 20 for showing positions or registered information.

Applicant's International Patent Application WO 98/20446 describes a device for registering text. This device can be used for position determination and information reading/decoding if it is programmed in a suitable manner. If it is to be used for pigment-based writing, it may also have a pen point.

The device can be divided into different physical casings, a first casing containing components which are necessary for obtaining images of the coding pattern and for transferring them to components which are located in a second casing and which carry out the calculations on the basis of the registered image or images.

As mentioned, calculations may be carried out by a processor that may use software for locating and decoding the symbols in an image and for determining the positions from the codes thus obtained. On the basis of the above example, a person of ordinary skill in the art can design software that carries out position determination on the basis of an image of a part of a position-coding pattern.

In the above embodiment, the pattern is optically readable and the sensor is thus optical. As mentioned, the pattern can be based on a parameter other than an optical parameter. In such a case, naturally, the sensor must be of the type that can read the parameter in question.

In the above embodiment, the raster is a grid network. It can also have other forms.

In the embodiment above, it is not the longest possible cyclic number series that is used. This provides a certain redundancy, which can be used, for example, for checking the rotation of the group of symbols read.

Figure 5:
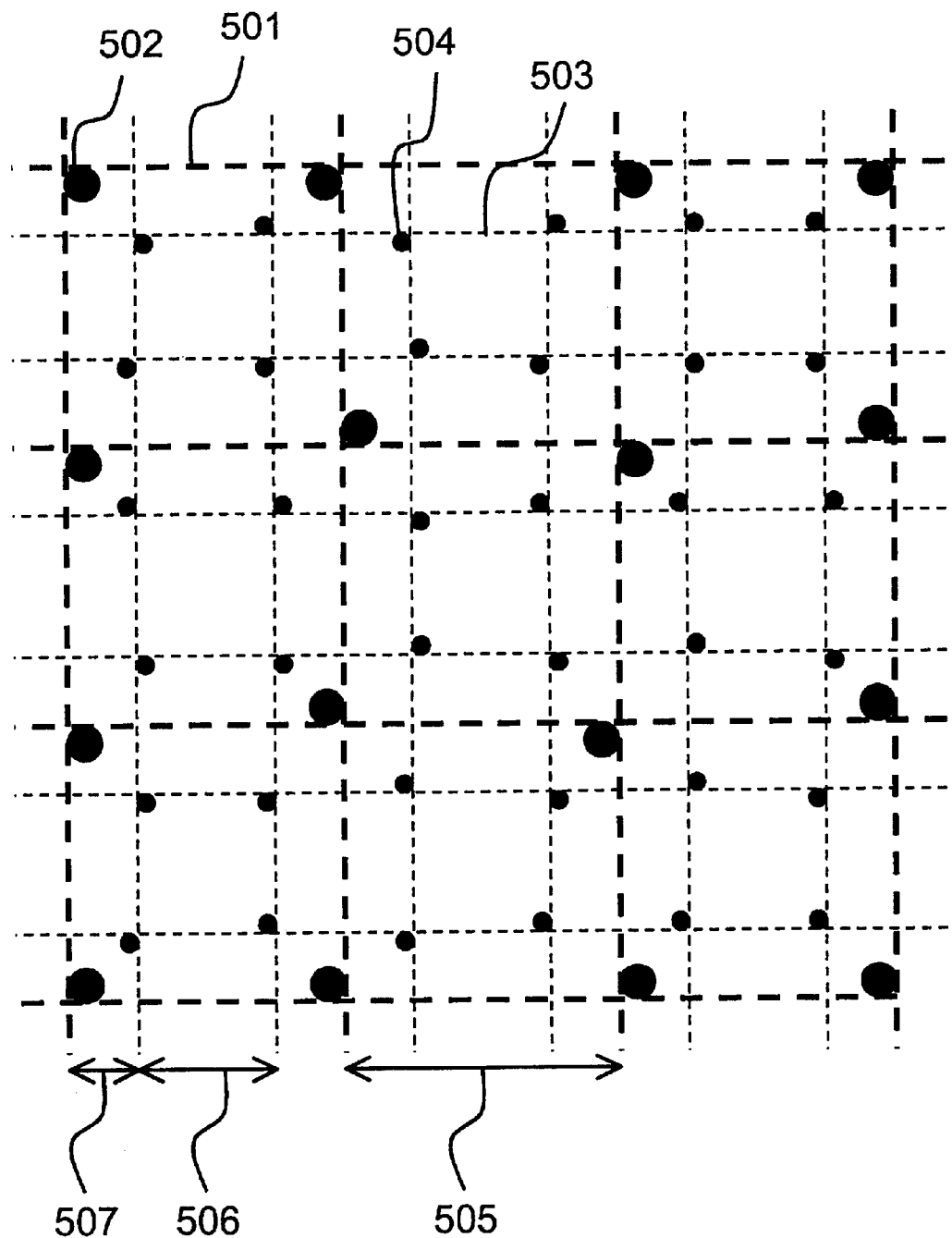
FIG. 5 shows a position-coding pattern and an information-coding pattern.

FIG. 5 shows a position-coding pattern combined with an information-coding pattern. The position-coding pattern in FIG. 5 includes a number of symbols of which markings 502 are shown together with a first raster defined by a number of raster lines 501. The information-coding pattern in FIG. 5 also includes a number of symbols, of which markings 504 are shown together with a second raster comprising a number of raster lines 503. Both patterns are of the same type as the position-coding pattern described in detail above, therefore, no detailed description will be given on how information is coded by means of the location of the markings with respect to each respective raster. Note, however, that the markings 502, 504 are not located along the raster lines as in the example described above. Rather, the markings 502, 504 are located in the respective quadrant defined by the intersections of the raster lines.

As has been discussed above, both coding patterns may in fact encode position information. In such a case the first position-coding pattern may encode positions from a first region or area and the second position-coding pattern may encode positions from a second region or area, thus increasing the total size of the region available for use.

As mentioned above, the raster lines 501, 503 can be virtual ones, i.e. invisible on the product on which the pattern is applied. The raster lines in FIG. 5 are thus shown only to increase clarity. As used throughout this disclosure, the term "raster" is collectively used to refer to both virtual and non-virtual rasters.

The first and second raster with raster lines 502, 504 have a first spatial scale 505 and a second spatial scale 506 respectively and may be displaced with respect to one another by a displacement distance 507. The patterns in FIG. 5, like the above illustrations, have been exaggerated in scale to increase clarity in these illustrations.

The different coding patterns can be displaced in relation to one another by a more or less optional distance and can be of different spatial scales. The result is that the different patterns do not coincide with one another. It is preferred that the displacement between the first and the second raster, the distance between the raster points in the first raster and the distance between the raster points in the second raster are related such that interference effects are avoided. For example, the distances may not have a common integer denominator which is greater than one. A product can be provided with a plurality of different coding patterns, for example three, in which the mutual displacements between the patterns differ from one another. Such a patterned product can also be provided with patterns with an information density that is only limited by the nature of the surface of the product and the printing technique used for the application.

The coding patterns may of course be applied to the product at different instances in time. For example, a product may be provided for sale having only a first position-coding pattern applied on its surface. A user of the product may subsequently apply, i.e. print, a second coding pattern on the product, and thereby may provide the product with further encoded information. Products, e.g. sheets of paper, may be completely covered by a first coding pattern with a very high resolution. A user subsequently may apply, by using, for example, a more or less conventional laser printer, a second coding pattern on at least a part of the area already provided with the first coding pattern. This second coding pattern may have a lower resolution as compared with the first pattern, depending on the capability of the specific printer used, although the pattern may encode user specific information.

Although it has been described above that the two, or more, coding patterns are similar in all but scale, the two coding patterns may differ in other respects. For example, one of the coding patterns may comprise markings of different sizes where the variation in size holds the information of the pattern. It may be possible to use any combination of coding patterns known in the art within the scope of the present invention.

Figure 6:
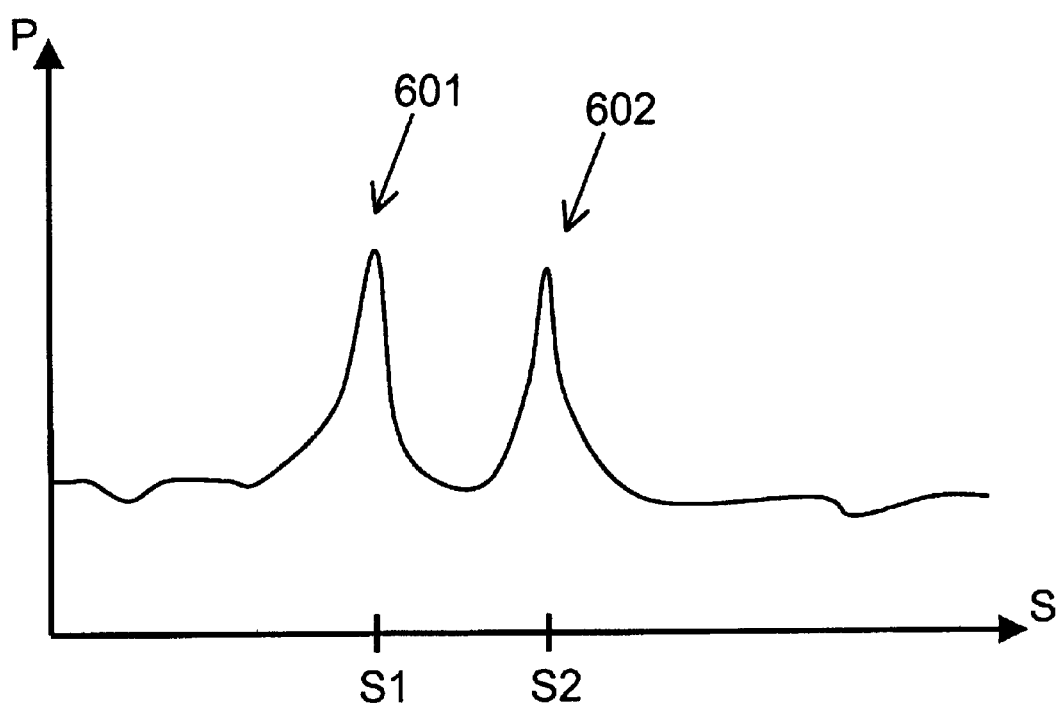
FIG. 6 shows a power spectrum for spatial frequencies of an image with two coding patterns.

A method for reading and interpreting a patterned surface according to FIG. 5 will now be described with reference to FIG. 6. The method can be implemented in an input device such as the device described in connection with FIG. 4.

In a first step, a patterned surface may be read and an image of the pattern stored in an image memory. The image thus may only comprise a dot pattern without the raster lines that are indicated in FIG. 5. In this image, the center for each dot may then be determined in some sense, for example in the form of peak blackening or the like, and may be described as a spike-shaped maximum at this point.

An analytic two-dimensional Fourier transformation may then be carried out on the data set, which consists of a number of spike-shaped maxima. This operation provides a two-dimensional spectrum of spatial frequencies. FIG. 6 illustrates such a spectrum along a spatial frequency axis S where two peaks 601, 602 for two spatial frequencies S1, S2 are shown. A power axis P is shown but without any marked scale since the figure is only intended to illustrate the spectrum in qualitative terms. The peaks originate from the typical spatial distance between markings 502 in the position-coding pattern and, respectively, the typical spatial distance between markings 504 in the information-coding pattern. From a two-dimensional image of a spatial spectrum (not illustrated), it should be possible to read off the phase differences between the peaks, these phase differences representing the rotation of the patterns.

These values, i.e. the typical spatial distance and rotations show the nature of the two patterns in terms of around which coordinates the actual dots are displaced.

After that, the calculation of positions and decoding of other information from the two patterns may be carried out as described above.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No._____, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A surface, comprising:
    a first coding pattern of symbols and a second coding pattern of symbols wherein:
        each symbol of the first coding pattern has at least two different values;
        each symbol of the second coding pattern has at least two different values;
        each symbol of the first coding pattern is defined by a first raster point and at least one first marking, wherein the first raster point is included in a first raster which extends over the surface; and
        each symbol of the second coding pattern is defined by a second raster point and at least one second marking, wherein the second raster point is included in a second raster which is displaced in relation to the first raster and has a different spatial scale than the first raster.

2. A surface according to claim 1, wherein a value of each symbol of the first and the second coding patterns is based on a location of the first and second marking in relation to the first and second raster point in the first and second raster, respectively.

3. A surface according to claim 2, wherein a displacement between the first and the second raster, a distance between the raster points in the first raster, and a distance between the raster points in the second raster are such that interference effects are avoided.

4. A surface according to claim 1, wherein the first and second markings of the symbols of the first and second coding pattern are identical.

5. A surface according to claim 1, wherein:
    the first coding pattern is a position-coding pattern, which codes a plurality of positions on the surface, wherein each position on the surface is coded by a plurality of symbols; and
    the second coding pattern is an information-coding pattern, which codes other information.

6. A surface according to claim 5, wherein each symbol of the first coding pattern contributes to the coding of more than one of said plurality of positions on the surface.

7. A surface according to claim 5, wherein each symbol of the first coding pattern contributes to coding a first and a second position coordinate.

8. A surface according to claim 7, wherein a value of each symbol of the first coding pattern can be translated into at least one first digit which is used for coding the first position coordinate and at least one second digit which is used for coding the second position coordinate, wherein the symbols in the first coding pattern together represent a first position code for the first position coordinate and a second position code for the second position coordinate.

9. A surface according to claim 5, wherein the first coding pattern is based on a first cyclic number series wherein no sequence with a first predetermined number of digits in the first cyclic number series occurs more than once.

10. A surface according to claim 9, wherein the first position coordinate is coded based on the first cyclic number series being repeated in columns over the surface and wherein the columns begin at different places in the first cyclic number series.

11. A surface according to claim 10, wherein the second position coordinate is coded with a second cyclic number series being repeated in rows over the surface, the rows beginning at different places in the second cyclic number series, and wherein no sequence with a second predetermined number of digits in the second cyclic number series occurs more than once.

12. A surface according to claim 11 further comprising:
a plurality of writing surfaces wherein each writing surface includes the first coding pattern, wherein the first coding pattern of each respective writing surface differs for the different writing surfaces through the sequence in the cyclic number series with which a predetermined column or row begins.

13. A surface according to claim 1, wherein the first coding pattern and the second coding pattern are position-coding patterns.

14. A surface according to claim 1, wherein the first and the second raster and the first and second raster points are virtual.

15. A surface according to claim 1, wherein each symbol in the first and the second coding pattern has only one marking, which can be placed on one of four predetermined positions on lines of the first and second raster, respectively, so that each symbol has one of only four values.

16. A surface according to claim 1, wherein the first and second coding patterns are optically readable.

17. A method for producing a position-coding pattern and an information-coding pattern on a surface, wherein the coding patterns comprise symbols, each of which represents at least two different values, wherein the values depend on position information and other information for the position-coding pattern and the information-coding pattern, respectively, the method comprising:
determining a first raster with first raster points and a second raster with second raster points, wherein the second raster is displaced in relation to the first raster and has a different spatial scale than the first raster;
determining a configuration of the symbols of the position-coding pattern and the information-coding pattern, wherein each symbol of the position-coding pattern is defined by a first raster point in the first raster and at least one first marking and each symbol in the second coding pattern is defined by a second raster point in the second raster and at least one second marking.

18. A method according to claim 17, wherein determining a configuration of the symbols includes displacing the markings in relation to each first raster point and second raster point, respectively based on the value of a symbol of the position-coding pattern and the information-coding pattern, respectively.

19. A method according to claim 18, wherein determining a first raster and a second raster includes determining a displacement between the first and the second raster, a distance between the first raster points in the first raster, and a distance between the second raster points in the second raster such that interference effects are avoided.

20. A method according to claim 17, wherein the position-coding pattern codes a plurality of positions on the surface and each position is coded by a plurality of symbols.

21. A method according to claim 20, wherein each symbol in the position-coding pattern contributes to the coding of more than one of said plurality of positions.

22. A method according to claim 20, wherein each symbol in the position-coding pattern contributes to the coding of a first and a second position coordinate.

23. A method according to claim 22, wherein the value of each symbol in the position-coding pattern can be translated into at least one first digit which is used for coding the first position coordinate and at least one second digit which is used for coding the second position coordinate, wherein the symbols in the position-coding pattern together represent a first position code for the first position coordinate and a second position code for the second position coordinate.

24. A method according to claim 20, wherein the position-coding pattern is based on a first cyclic number series wherein no sequence with a first predetermined number of digits in the first cyclic number series occurs more than once.

25. A method according to claim 22, wherein the first coordinate is coded based on a first cyclic number series being repeated in columns over the surface, the columns beginning at different places in the first cyclic number series, and wherein no sequence with a first predetermined number of digits occurs more than once in the first cyclic number series.

26. A method according to claim 25, wherein the second coordinate is coded based on a second cyclic number series being repeated in rows over the surface, the rows beginning at different places in the second cyclic number series, and wherein no sequence with a second predetermined number of digits occurs more than once in the second cyclic number series.

27. A method according to claim 26 further comprising:
determining a coding pattern for a plurality of writing surfaces wherein each writing surface includes the position-coding pattern, wherein the position-coding pattern of each respective writing surface differs for the different writing surfaces through the sequence in the cyclic number series with which a predetermined column or row begins.

28. A method according to claim 17, wherein the first and second raster and the first and second raster points are virtual.

29. A method according to claim 17, wherein producing the information-coding pattern includes producing a second position-coding pattern having symbols that represent positions.

30. A method according to claim 17, wherein each symbol in the position-coding pattern and the information-coding pattern has only one marking which can be placed in one of four predetermined positions on lines of the first and second raster, respectively, so that each symbol has one of only four values.

31. A method according to claim 17, wherein the information coding pattern is produced subsequent to the production of the position coding pattern.

32. A computer program which comprises instructions for causing a computer to execute a method according to claim 17.

33. A method for reading a position-coding pattern and an information-coding pattern on a surface, wherein the coding patterns include symbols each of which represents at least two different values, wherein the values depend on position information and other information for the position-coding pattern and information-coding pattern, respectively, the method comprising:
reading a part of the surface and storing the read information in an image;
determining a first virtual raster with raster points in the image associated with the position-coding pattern and a second virtual raster with raster points in the image associated with the information-coding pattern, wherein the second raster is displaced in relation to the first raster and has a spatial scale different from a spatial scale of the first raster;
locating a plurality of symbols in the position-coding pattern and information-coding pattern;
determining a value of each of the plurality of symbols, wherein each symbol of the position-coding pattern is defined by a first raster point in the first virtual raster and at least one first marking, and each symbol of the information-coding pattern is defined by a second raster point in the second raster and at least one second marking;

separating the position-coding pattern in the image into a first position code for a first coordinate for a partial surface and a second position code for a second coordinate for the partial surface by translating the value of each symbol into at least one first digit for the first position code and at least one second digit for the second position code; and calculating the first coordinate using the first position code and the second coordinate using the second position code.

34. A method according to claim 33, wherein determining the value of each of the plurality of symbols of the position-coding pattern and an information-coding pattern include determining a displacement of the location of the markings for each symbol in relation to the first and second raster point for each symbol, respectively.

35. A method according to claim 34, wherein determining the first and second rasters is carried out using a spatial frequency spectrum of the image.

36. A method according to claim 35, wherein the spatial frequency spectrum is determined by Fourier transformation.

37. A computer program which comprises instructions for causing a computer to execute a method according to claim 33.

38. A computer program which comprises instructions for causing a computer to execute a method according to any one of claims 33.

39. A method according to claim 33, further comprising:

separating the information-coding pattern in the image into a third position code for a third coordinate for a partial surface and a fourth position code for a fourth coordinate for a partial surface by translating the value of each symbol into at least a third digit for a third position code and at least a fourth digit for a fourth position code; and calculating the third coordinate based on the third position code and the fourth coordinate based on the fourth position code;

wherein the symbols of the information -coding pattern represent positions.

40. A device for reading a position-coding pattern and an information-coding pattern on a surface, wherein the position-coding pattern and the information-coding pattern comprise symbols, each of which represents at least two different values, wherein the values depend on position information and other information for the position-coding pattern and the information-coding pattern, respectively, the device comprising:

means for reading a part of the surface and storing information read in an image;

means for determining a first virtual raster with first raster points in the image associated with the position-coding pattern and a second virtual raster with second raster points in the image associated with the information-coding pattern, wherein the second raster is displaced in relation to the first raster and has a spatial scale different from a spatial scale of the first raster;

means for locating a plurality of symbols in the position-coding pattern and information-coding pattern;

means for determining a value of each of said plurality of symbols, wherein each symbol in the position-coding pattern is defined by a first raster point in the first raster and at least one first marking and each symbol in the information-coding pattern is defined by a second raster point in the second raster and at least one second marking;

means for separating the position-coding pattern in the image into a first position code for a first coordinate for a partial surface and a second position code for a second coordinate for the partial surface by translating the value of each symbol into at least a first digit for a first position code and at least a second digit for a second position code; and means for calculating the first coordinate based on the first position code and the second coordinate based on the second position code.

41. A device according to claim 40, wherein the means for determining the value of each of the plurality of symbols of the position-coding pattern and the information-coding pattern includes means for determining a displacement of the location of the markings for each symbol in relation to the first raster point and the second raster point respectively for each symbol, respectively.

42. A device according to claim 41, wherein the means for determining a first virtual raster and a second virtual raster are executed with the aid of means for determining a spatial frequency spectrum of the image.

43. A device according to claim 42, wherein the spatial frequency spectrum is determined using a Fourier transformation.

44. A device according to claim 40, further comprising:

means for separating the information-coding pattern in the image into a third position code for a third coordinate for a partial surface and a fourth position code for a fourth coordinate for a partial surface by translating the value of each symbol into at least a third digit for a third position code and at least a fourth digit for a fourth position code; and means for calculating the third coordinate based on the third position code and the fourth coordinate based on the fourth position code;

wherein the symbols of the information -coding pattern represent positions.

45. A device according to claim 40, where in the device is handheld.

46. A device according to claim 40, wherein the device includes means for wireless transmission of information.

* * * * *